US010254904B2

(12) United States Patent
Satou

(10) Patent No.: US 10,254,904 B2
(45) Date of Patent: Apr. 9, 2019

(54) CONDUCTIVE SHEET, CAPACITIVE TOUCH PANEL, AND DISPLAY DEVICE

(71) Applicant: FUJIFILM Corporation, Tokyo (JP)

(72) Inventor: Tasuku Satou, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 82 days.

(21) Appl. No.: 15/167,418

(22) Filed: May 27, 2016

(65) Prior Publication Data

US 2016/0274703 A1 Sep. 22, 2016

Related U.S. Application Data

(63) Continuation of application No. PCT/JP2014/074912, filed on Sep. 19, 2014.

(30) Foreign Application Priority Data

Dec. 3, 2013 (JP) .................................. 2013-250333

(51) Int. Cl.
*G06F 3/044* (2006.01)

(52) U.S. Cl.
CPC .... *G06F 3/044* (2013.01); *G06F 2203/04112* (2013.01)

(58) Field of Classification Search
CPC ........................ G06F 2203/04112; G06F 3/044
USPC .......................................... 345/633, 170–173
See application file for complete search history.

(56) References Cited

U.S. PATENT DOCUMENTS

| 2010/0225612 | A1 | 9/2010 | Ishizaki et al. |
| 2011/0310037 | A1* | 12/2011 | Moran .................. G06F 3/0412 345/173 |
| 2012/0293430 | A1 | 11/2012 | Kitada |
| 2014/0118641 | A1 | 5/2014 | Ryu et al. |

(Continued)

FOREIGN PATENT DOCUMENTS

| CN | 101825791 A | 9/2010 |
| CN | 102334091 A | 1/2012 |
| JP | 2011-59772 A | 3/2011 |

(Continued)

OTHER PUBLICATIONS

International Search Report for PCT/JP2014/074912 (PCT/ISA/210) dated Nov. 11, 2014.

(Continued)

*Primary Examiner* — Tony Davis
(74) *Attorney, Agent, or Firm* — Birch, Stewart, Kolasch & Birch, LLP

(57) ABSTRACT

In a conductive sheet constituting a touch panel for use in a display device, it is possible to improve the transmittance of electrodes having meshes, to improve sensitivity of touch detection, and to suppress the occurrence of moire. A conductive sheet has an underlying first electrode and an overlying second electrode with a second sheet body as an insulating layer sandwiched therebetween. The first electrode and the second electrode respectively include a plurality of first cells and a plurality of second cells which are formed in a diamond shape by making thin wires and formed with metal wires intersect each other. The average cell pitch of the second cells is set to an integer multiple equal to or greater than two times and equal to or less than eight times the average cell pitch of the first cell.

22 Claims, 18 Drawing Sheets

(56) References Cited

U.S. PATENT DOCUMENTS

2014/0333555 A1* 11/2014 Oh .................. G06F 3/044
                                                      345/173
2015/0138151 A1   5/2015 Moran et al.

FOREIGN PATENT DOCUMENTS

| JP | 2012-519329 A | 8/2012 |
| JP | 2012-243058 A | 12/2012 |
| KR | 10-2011-0127236 A | 11/2011 |
| WO | WO 2012/169848 A2 | 12/2012 |

OTHER PUBLICATIONS

Written Opinion of the International Searching Authority for PCT/JP2014/074912 (PCT/ISA/237) dated Nov. 11, 2014.
International Preliminary Report on Patentability (Form PCT/IPEA/409), dated Sep. 7, 2015, for International Application No. PCT/JP2014/074912, together with an English translation thereof.
Japanese Office Action, dated Sep. 6, 2016, for Japanese Application No. 2013-250333, together with an English translation thereof.
Taiwanese Office Action issued in Taiwanese Application No. 103136267, dated Jun. 14, 2017, together with an English translation.
Korean Notification of Reason for Refusal, dated Jul. 20, 2017, for Korean Application No. 10-2016-7013246, with an English translation.
Chinese Office Action, dated Mar. 30, 2018, for Chinese Application No. 201480062770.7 with English translation.
Chinese Office Action dated Oct. 17, 2018, for corresponding Chinese Application No. 201480062770.7, with an English Translation.

* cited by examiner

*Pd IS AVERAGE OF 30 CELL PITCHES

CONDUCTIVE SHEET, CAPACITIVE TOUCH PANEL, AND DISPLAY DEVICE

CROSS-REFERENCE TO RELATED APPLICATIONS

This application is a Continuation of PCT International Application No. PCT/JP2014/074912 filed on Sep. 19, 2014, which claims priority under 35 U.S.C. § 119(a) to Japanese Patent Application No. 2013-250333 filed Dec. 3, 2013. Each of the above applications is hereby expressly incorporated by reference, in its entirety, into the present application.

BACKGROUND OF THE INVENTION

1. Field of the Invention

The present invention relates to a conductive sheet, a capacitive touch panel, and a display device.

2. Description of the Related Art

As a display device of a multifunctional mobile phone (smartphone), a digital camera, or the like, a so-called touch panel on which various operations can be performed by touch with a finger has been widely used. In these devices, the display device has a small size, and recently, a touch panel has also been used in a large display device of a personal computer or the like. In particular, a mutual capacitive touch panel which can detect a plurality of places simultaneously (allows multi-touch) has become widespread.

In a touch panel, it is necessary that electrodes are made hard to be visually recognized by an operator and are excellent in conductivity. In a small touch panel, for example, indium-tin complex oxide (ITO) electrodes are used; however, in a case where ITO electrodes are used in a large touch panel, sufficient conductivity is not obtained and reduction in cost is difficult.

Accordingly, for example, as described in JP2011-059772A, electrodes which have a mesh pattern (mesh) with a plurality of linked cells formed by making thin metal wires intersect each other are used. In this case, since an opening is formed in each cell, the electrodes exhibit light transmittance, and for this reason, the electrodes are substantially transparent. There is also advantage in that the mesh made of metal is high in conductivity and can be provided at low cost.

As described in JP2012-243058A, for example, electrodes are laminated under and above an insulating layer, and accordingly, the lower electrode and the upper electrode are opposed to each other at a plurality of places through the insulating layer. Capacitance is generated between the respective opposing places, and if the touch panel is pressed with a finger, capacitance changes with the effect of the finger. A pressed point of the touch panel is detected from the amount of change at this time, and an issued operation command is determined.

JP2012-243058A also discloses that, in a touch panel using mesh electrodes, a cell pitch of an upper electrode (in JP2012-243058A, "reception electrode") is made greater than a cell pitch of a lower electrode (in JP2012-243058A, "transmission electrode"), thereby increasing detection accuracy.

SUMMARY OF THE INVENTION

In the mutual capacitive touch panel, in order to improve detection sensitivity, there is a case where the electrode width of the lower electrode (in a direction orthogonal to a longitudinal direction) is made large, and the electrode width of the upper electrode is made small (the upper electrode is an electrode close to a touch surface, and the lower electrode is an electrode far from the touch surface; hereinafter, the lower electrode is referred to as a first electrode, and the upper electrode is referred to as a second electrode).

Accordingly, in the mesh electrodes, in order to decrease the electrode width of the upper electrode, the average cell pitch of the mesh may be decreased with a decrease in the electrode width. However, in this case, light transmission is degraded when the opening area of the cell becomes small. In a case of decreasing the electrode width to prevent degradation of transmittance without decreasing the mesh pitch, the upper electrode which should be formed as a mesh may not become a mesh in practice and may be formed with only lines. When this happens, there is a problem in that the electrodes do not function when unintended disconnection of the electrodes occurs.

Accordingly, as described in JP2012-243058A, while increasing the cell pitch of the upper electrode to increase detection sensitivity has been considered, it is understood that there is a severe problem in that the difference in the cell pitch between the upper electrode and the lower electrode causes periodic interference (moire) between the two electrodes and the existence of the mesh is easily visually recognizable.

The invention has been accomplished in order to solve the above-described problems, and an object of the invention is to provide a conductive sheet, a capacitive touch panel, and a display device in which the transmittance of mesh electrodes is high and touch detection accuracy is high.

The above-described object is attained by the configuration of [1] described below.

[1] A conductive sheet comprises a first electrode disposed under an insulating layer, and a second electrode disposed above the insulating layer, the first electrode and the second electrode being opposed to each other through the insulating layer. The first electrode has a first mesh with a plurality of linked first cells in a diamond shape formed by making metal wires intersect each other, a plurality of first electrodes extending in a first direction and being arranged in parallel in a second direction orthogonal to the first direction, the second electrode has a second mesh with a plurality of linked second cells in a diamond shape formed by making metal wires intersect each other, a plurality of second electrodes extending in the second direction and being arranged in parallel in the first direction, and when the average cell pitch of the first cells is Pd and the average cell pitch of the second cells is Ps, Ps/Pd is an integer equal to or greater than 2 and equal to or less than 8.

In the invention described in JP2012-243058A, although the relationship between the average cell pitch in the lower electrode and the average cell pitch in the upper electrode is not clear, in the invention, the relationship described above is provided between the average cell pitch Pd of the first cells of the first electrode as a lower electrode and the average cell pitch Ps of the second cells of the second electrode as an upper electrode. Then, in this case, an electric field which is generated from the first electrode toward the second electrode easily passes through the openings of the second cells. For this reason, it is possible to increase the amount of change in capacitance between before and after the press of the finger without decreasing the electrode width (the dimension in a direction orthogonal to the longitudinal direction) of the second electrode. For this reason, touch detection accuracy is improved.

Since both the first electrodes and the second electrodes can be formed as a mesh having a wide electrode width, it is possible to realize electrodes which are hardly affected by disconnection and are easily designed or produced.

In addition, since Ps/Pd is an integer equal to or greater than 2 and equal to or less than 8, the occurrence of moire due to the difference between the average cell pitches of the upper electrode and the lower electrode is reduced.

[2] It is more preferable that Ps/Pd is an integer equal to or greater than 2 and equal to or less than 6. This is because the amount of change in capacitance between before and after touch is remarkably increased.

[3] It is preferable that an effective electrode area of the second electrode is equal to or greater than 70% of an effective touch area. With this, since it is possible to allow the upper electrode to have a sufficient width and high conductivity, it is possible to contribute to an increase in area and reduction in power consumption of the touch panel.

[4] It is preferable that dummy thin wires are provided in the openings of the second cells at positions where the first cells are included in the openings of the second cells in plan view. With this, it is possible to avoid the occurrence of the difference between the coarse and dense patterns of the metal wires of the first cells in the openings of the second cells and the surrounding first cells. Therefore, the metal mesh electrodes are made hard to be visually recognized. In a case where the dummy thin wires are provided in the openings of the second cells, it is preferable to disconnect the dummy thin wires into small pieces so as to prevent interference with the passage of an electric field and a magnetic field.

[5] The average cell pitch of the first cells in the openings may be set to be smaller than the average cell pitch of the cells surrounding the first cells in the openings at positions where the first cells are included in the openings of the second cells in plan view. In this case, as above, it is possible to avoid the occurrence of the difference between the coarse and dense patterns of the metal wires of the first cells in the openings of the second cells and the surrounding first cells. In this case, since conductive electrodes are provided, instead of electrodes, such as the dummy thin wires, which do not contribute to conduction, it is possible to increase conductivity of the lower electrode. For this reason, preferably, it is possible to achieve both conductivity and visibility.

[6] When the electrode width of the first electrode is Wd and the electrode of the second electrode is Ws, Ws/Wd may be set to be equal to or greater than 0.5 and equal to or less than 1.5. The electrode width indicates the dimension of the first electrode and the second electrode in the direction orthogonal to the longitudinal direction, and in a case where the width of each electrode varies, it is assumed that comparison is made with the average widths of the respective electrodes.

That is, in the invention, unlike the related art, it is not particularly necessary to make the electrode width Ws of the second electrode smaller than the electrode width Wd of the first electrode, and the electrode width Ws of the second electrode may be equal to or greater than the electrode width Wd of the first electrode. For this reason, the degree of freedom of design of the second electrode is improved.

[7] The average cell pitch of the first cells at the positions included in the openings of the second cells may be set, for example, equal to or greater than 50 μm and equal to or less than 400 μm. In this case, the average cell pitch of the second cells may be equal to or greater than 100 μm and equal to or less than 3,200 μm.

[8] At least the metal wires forming the first cells or the metal wires forming the second cells may be reduced in line width or become a disconnection portion at a part of places where the first mesh and the second mesh are opposed to each other. In this case, since it is possible to avoid an excessive increase in the initial value of capacitance, it is possible to achieve improvement of a signal to noise ratio (S/N ratio).

[9] The electrode width of at least the first electrode or the second electrode may be set to be smaller than other parts (that is, parts other than the opposing places) at places where the first mesh and the second mesh are opposed to each other. In this configuration, as above, since it is possible to reduce the number of places where the metal wires are opposed to each other, the initial value of capacitance is lowered, thereby achieving improvement of the S/N ratio.

[10] The invention is a capacitive touch panel having the conductive sheet configured as above.

[11] The invention is a display device having the above-described capacitive touch panel.

According to the invention, the average cell pitch of the second cells forming the second electrode (upper electrode) is set to be greater than the average cell pitch of the first cells forming the first electrode (lower electrode), and the ratio between both average cell pitches is an integer equal to or greater than 2 and equal to or less than 8. In this configuration, the proportion of an electric field emitted from the lower electrode which passes through the openings of the mesh of the upper electrode without being absorbed is increased, and the passed electric field is affected by a touched finger; thus, the amount of change in capacitance between before and after touch can be increased, and touch detection accuracy is improved. Furthermore, since Ps/Pd is an integer equal to or greater than 2 and equal to or less than 8, periodic interference between the upper electrode and the lower electrode does not occur, and moire is reduced.

DESCRIPTION OF THE PREFERRED EMBODIMENTS

Hereinafter, preferred embodiments of a conductive sheet and a capacitive touch panel according to the invention will be described in detail referring to the accompanying drawings, in relation to a display device comprising the conductive sheet and the capacitive touch panel. In this specification, "to" indicating a numerical value range is used to mean numerical values described before and after "to" as a lower limit value and an upper limit value.

Figure 1:
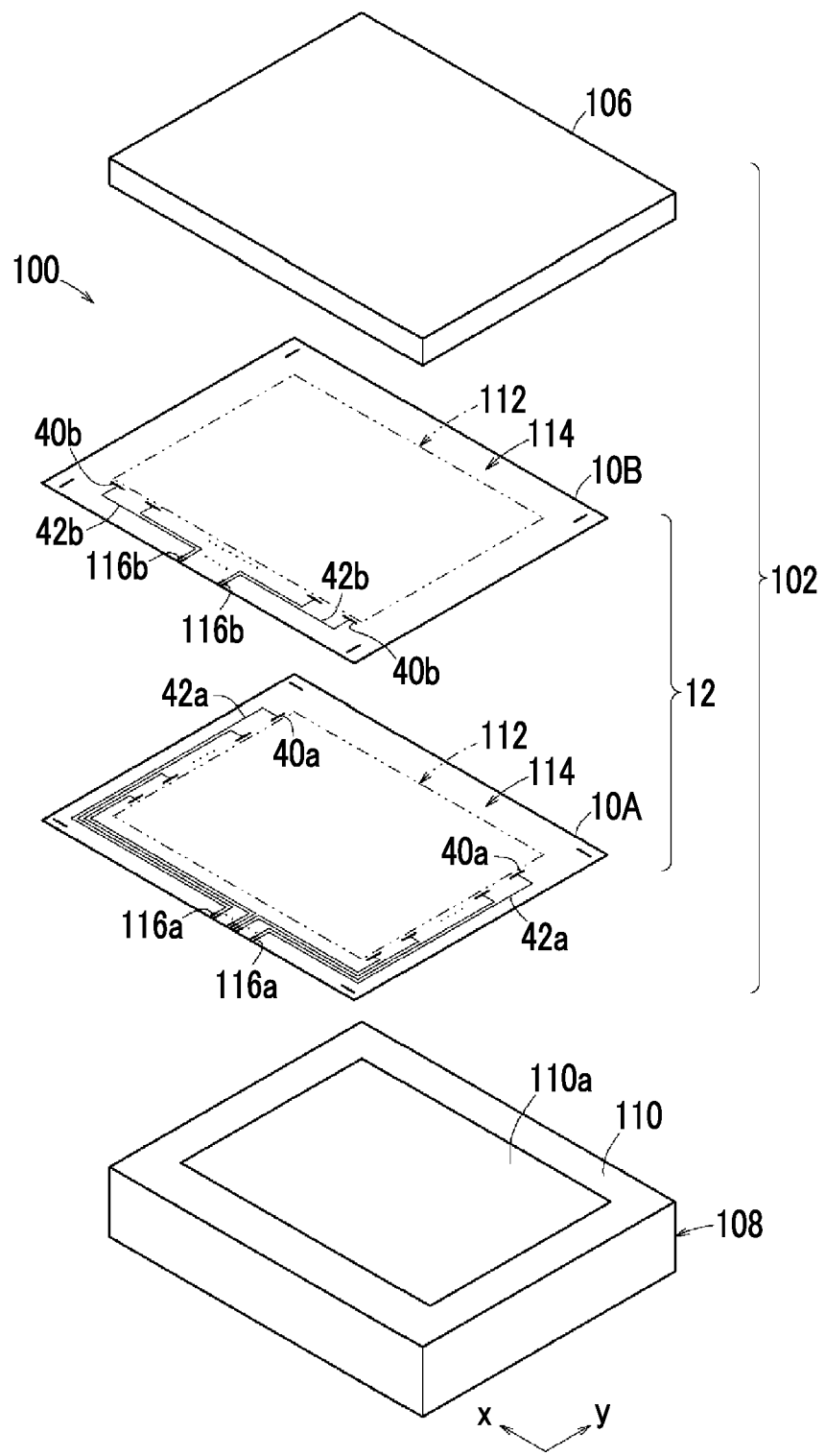
FIG. 1 is an exploded perspective view of a main part of a display device comprising a touch panel according to an embodiment of the invention.

FIG. 1 is an example of an exploded perspective view of a main part of a display device 108 including a touch panel 100 according to this embodiment. First, the touch panel 100 will be described. The touch panel 100 has a sensor body 102 and a control circuit (IC circuit or the like) (not shown).

The sensor body 102 has a laminated conductive sheet (conductive sheet) 12 in which a first sheet body 10A and a second sheet body 10B are laminated in this order from the below, and a protective layer 106 laminated on the second sheet body 10B. That is, in the sensor body 102, the first sheet body 10A, the second sheet body 10B, and the protective layer 106 are laminated from the below.

The sensor body 102 (the laminated conductive sheet 12 and the protective layer 106) is disposed on a display panel 110 in the display device 108, and constitutes, for example, a liquid crystal display or the like. The sensor body 102 has a sensor portion 112 of a touch position disposed in a region corresponding to a display screen 110a of the display panel 110 when visually recognized from a top surface, and a terminal wiring portion 114 (so-called frame) disposed in a region corresponding to a peripheral portion of the display panel 110.

The laminated conductive sheet 12 will be described referring to FIGS. 2 and 3, in which a main part is enlarged. The invention is not limited to the following embodiments, and various alterations may be of course made without departing from the object of the invention.

The first sheet body 10A has first electrodes 18A which are formed on one principal surface of a first transparent base 14A as an insulating layer. Similarly, the second sheet body 10B has second electrodes 18B which are formed on one principal surface of an insulating second transparent base 14B. Here, although the configuration in which the second transparent base 14B is sandwiched between the electrodes 18A and 18B has been described, it is preferable that conductive films are opposed to each other and bonded to each other by a transparent adhesive. It is also preferable that the first electrodes 18A and the second electrodes 18B are disposed on both surfaces of one transparent base.

The thickness of the first transparent base 14A and the second transparent base 14B is preferably 10 µm to 350 µm or less, more preferably, 20 µm to 250 µm, and particularly preferably, 30 µm to 200 µm.

As the first transparent base 14A and the second transparent base 14B, a plastic film, a plastic plate, a glass plate, or the like can be considered.

As the material for the plastic film and the plastic plate, for example, polyesters, such as polyethylene telephthalate (PET) or polyethylene naphthalate (PEN); polyolefins, such as polyethylene (PE), polypropylene (PP), polystyrene, or polyethylene vinyl acetate (EVA); vinyls; polycarbonate (PC), polyamide, polyimide, acrylic resin, triacetylcellulose (TAC), cycloolefin polymer (COP), and the like are available. It is preferable that the transmittance of the first transparent base 14A and the second transparent base 14B is equal to or greater than 85%.

Figure 2:
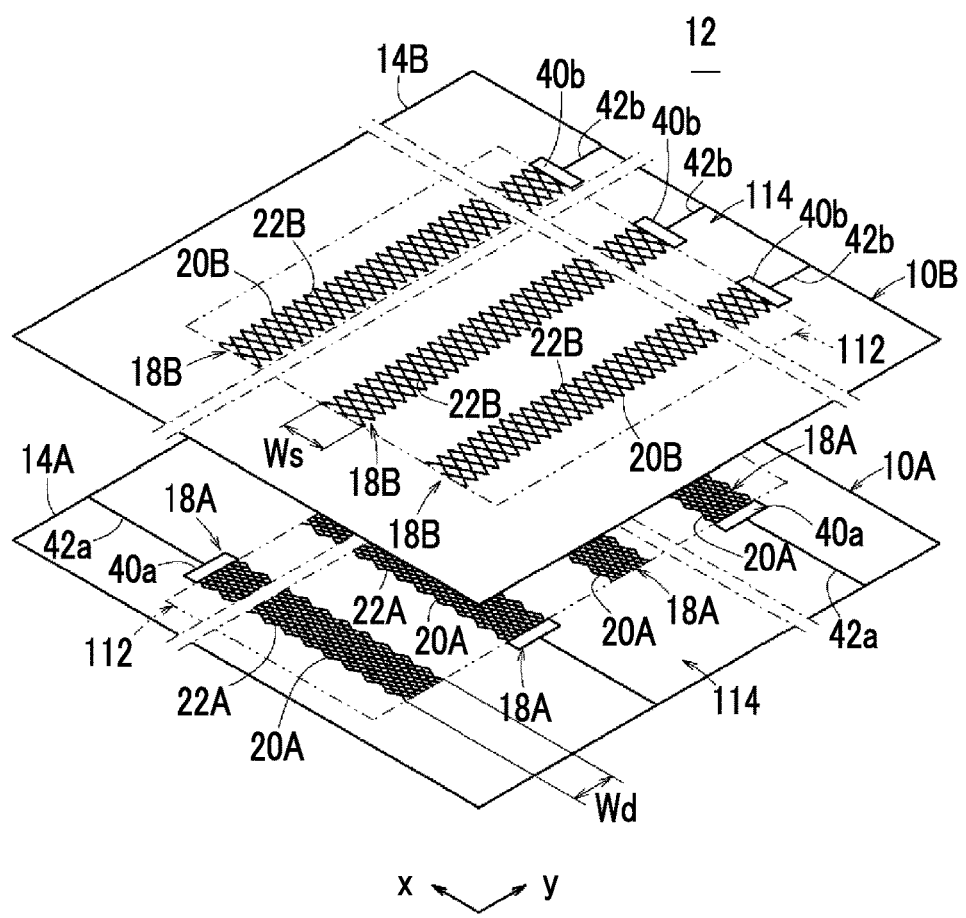
FIG. 2 is an exploded perspective view of a main part of a conductive sheet constituting the touch panel.

In a case of this embodiment, as shown in FIG. 2, the first electrodes 18A have a plurality of band-like patterns extending in a first direction (x direction/longitudinal direction). A plurality of first electrodes 18A have a predetermined width direction dimension (electrode width Wd) in a second direction (a direction orthogonal to the first direction: y direction), and are arranged in parallel in the y direction.

Each first electrode 18A is formed by making thin wires 20A (metal wires) made of silver, copper, molybdenum, or an alloy containing one or more of them intersect each other. With the intersection, a plurality of spaces (openings) surrounded by the thin wires 20A, that is, first cells 22A, are formed.

Figure 4:
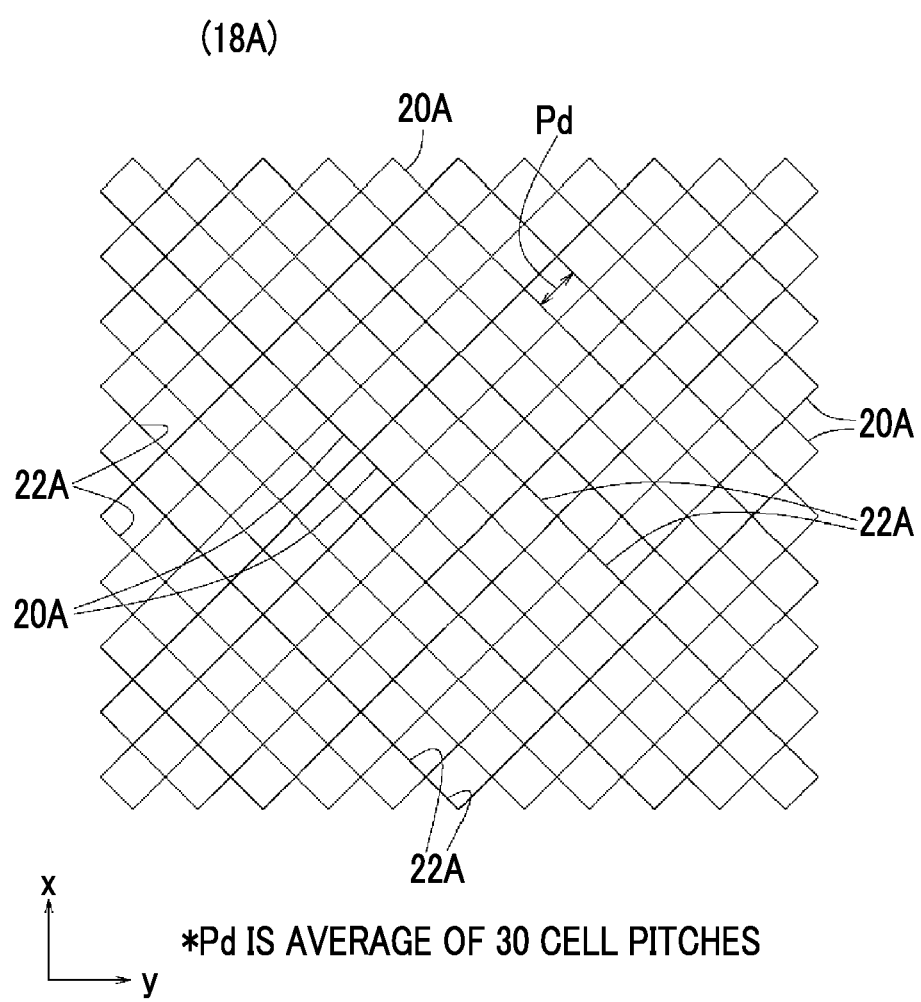
FIG. 4 is an example of an enlarged plan view of a main part of a first electrode in the conductive sheet.

As shown in FIG. 4 which is an example of an enlarged view of a main part of the first electrode 18A, in this case, the first cells 22A have a diamond shape in which the length of four sides are same. That is, the first electrode 18A is formed with a first mesh with a plurality of linked first cells 22A in a diamond shape.

As shown in FIG. 4, it is preferable that an average cell pitch Pd obtained by measuring and averaging 30 intervals between adjacent first cells 22A, that is, the cell pitches (the inter-center distance between adjacent cells) as the distance between the inside of one first cell 22A and the outside of an adjacent first cell 22A is 50 µm to 400 µm. The average cell pitch Pd is thus set, whereby it is effective to reduce moire and thin wire appearance. A more preferable range of the average cell pitch Pd is 50 µm to 300 µm.

Figure 5:
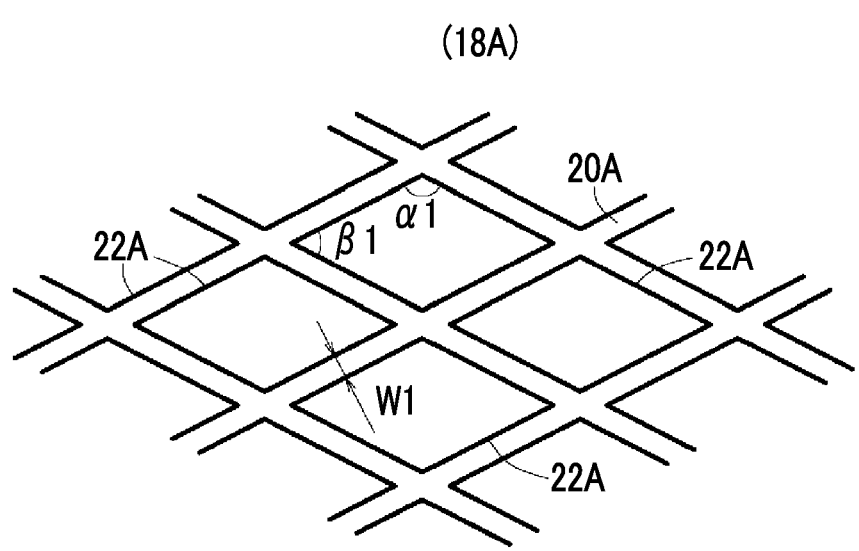
FIG. 5 is an enlarged view of a main part of first cells which form the first electrode.

FIG. 5 is an example of an enlarged view of a main part of the first electrode 18A. The width direction dimension (line width) W1 of the thin wires 20A is preferably set to be equal to or less than 10 µm, and more preferably, equal to or less than 5 µm. With this, moire of conductive patterns caused by the thin wires 20A and thin wire appearance are improved, and visibility is improved (that is, the thin wires 20A forming the first mesh are made hard to be visually recognized). In order to secure conductivity necessary for the touch panel 100, it is preferable that the width direction dimension W1 of the thin wires 20A is equal to or greater than 1 µm.

The first cells 22A illustrated in FIG. 5 have two obtuse angles and two acute angles. It is preferable that the intersection angles α1 of the obtuse angles in a diagonal relationship are the same angle greater than 90°, and the intersection angles β1 of the acute angles are the same angle less than 90°.

It is preferable that the intersection angles β1 as the acute angles are equal to or less than 70°. In this case, it is effective to reduce moire. However, even in a case where β1 is excessively small, moire is likely to occur. In order to avoid the occurrence of moire, it is preferable that β1 is in a range of 30° to 70°, and further, in a range of 45° to 70°. These angles are adjusted such that the pixels of the display and the mesh do not cause moire.

The first cells 22A are not limited to the shape illustrated in FIG. 5, and may of course have a horizontally long diamond shape or a vertically long diamond shape. Although a case where the values of α1 and β1 are different is shown, a case where both α1 and β1 are 90° is also included in the scope of the invention.

As shown in FIG. 2, one end portion of each first electrode 18A is electrically connected to a first terminal wiring pattern 42a of the thin wire 20A through a first connection portion 40a.

As shown in FIG. 2, the second electrodes 18B formed on one principal surface of the second transparent base 14B (see FIG. 3) constituting the second sheet body 10B have a plurality of band-like patterns extending in the second direction (y direction). A plurality of second electrodes 18B are arranged in the first direction (x direction). That is, in the laminated conductive sheet 12, as shown in FIG. 3, the first electrodes 18A and the second electrodes 18B are opposed to each other through the insulating second transparent base 14B.

Similarly to the first electrodes 18A, each second electrode 18B is formed by making thin wires 20B intersect each other. With the intersection, a plurality of spaces (openings) surrounded by the thin wires 20B, that is, second cells 22B, are formed.

Figure 6:
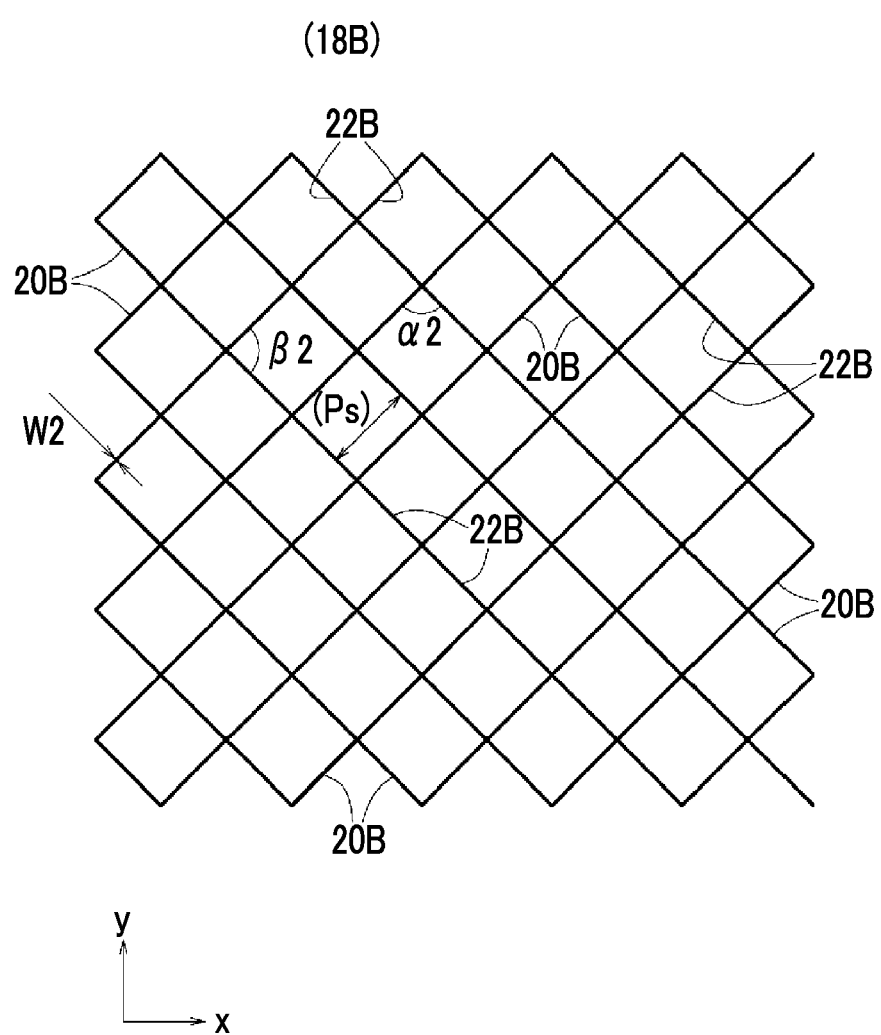
FIG. 6 is an example of an enlarged plan view of a main part of a second electrode formed in the conductive sheet.

As illustrated in FIG. 6, the second cells 22B have a diamond shape with a pitch greater than the first cells 22A. That is, the second electrodes 18B are formed with a second mesh with a plurality of linked second cells 22B in a diamond shape having a large pitch.

It is preferable that the intersection angle α2 is equal to α1, and the intersection angle β2 is equal to β1. That is, it is preferable that the first cells 22A and the second cells 22B are in a similarity relationship.

The line width W2 of the thin wires 20B in the second cells 22B is preferably in a range of 1 μm to 10 μm similarly to the first cells 22A since moire and thin wire appearance of conductive patterns are improved, visibility is improved (that is, the thin wires 20B forming the second mesh are made hard to be visually recognized), and conductivity necessary as the touch panel 100. In FIG. 4, the thin wires 20A are represented by thin solid lines, and in FIG. 6, the thin wires 20B are represented by thick solid lines; however, the thins solid lines and the thick solid lines are used to easily distinguish between the first mesh and the second mesh in the laminated state in the description of FIG. 7, and do not reflect actual line widths.

The average of the intervals between adjacent second cells 22B, that is, an average cell pitch Ps (a value obtained by measuring and averaging 30 intervals) is preferably in a range of 100 μm to 3,200 μm, and is set to be greater than the average cell pitch Pd of the first cells 22A. The average cell pitch Ps is an integer multiple (however, equal to or greater than two times and equal to or less than eight times) of the average cell pitch Pd. In summary, the following relational expression is established between the average cell pitch Ps and the average cell pitch Pd.

$Ps/Pd=2, 3, 4, 5, 6, 7, 8$

The integer multiple is not limited to a case of an accurate integer multiple, and includes a case of a substantial integer multiple capable of obtaining the effects of the invention. For example, a case where Ps/Pd is slightly deviated from an integer due to manufacturing errors or errors caused by calculating the average cell pitch of the 30 cells is also included in the scope of the invention.

Figure 7:
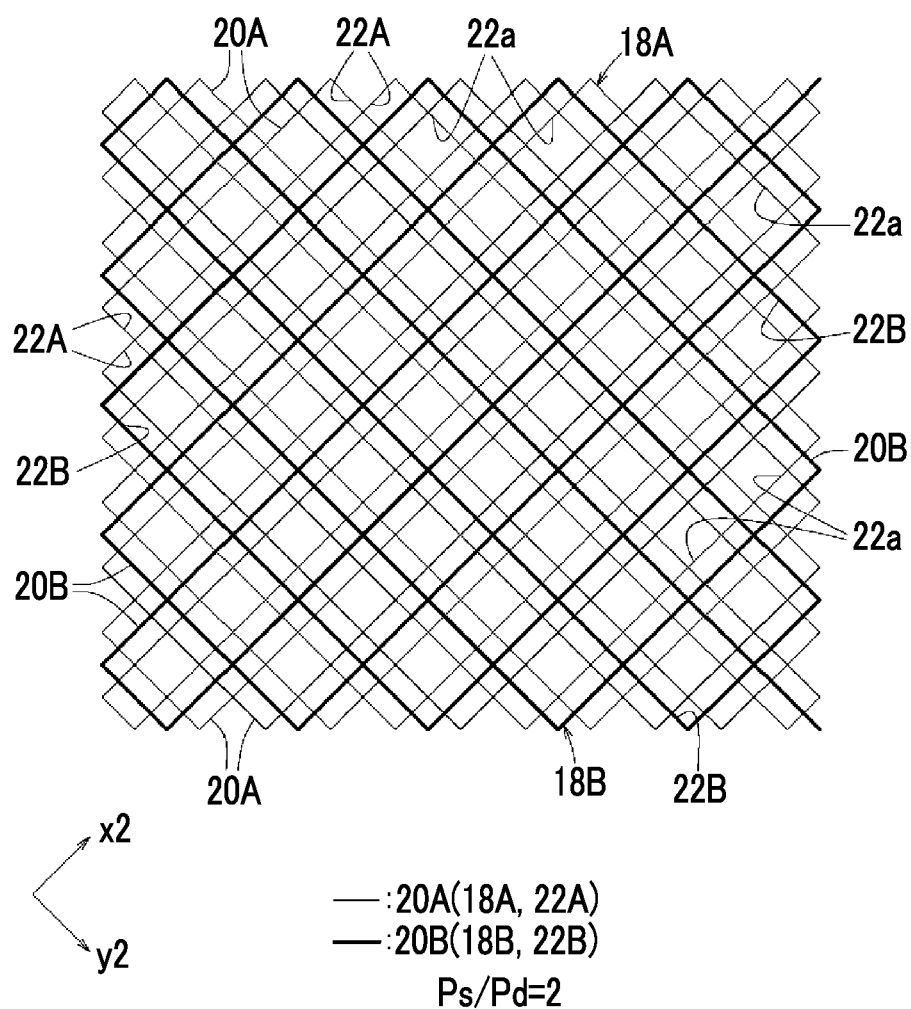
FIG. 7 is a schematic plan view showing an overlapping portion of the first electrode of FIG. 4 and the second electrode of FIG. 6.

FIG. 7 illustrates when the average cell pitch Ps of the second cells 22B is two times the average cell pitch Pd of the first cells 22A.

That is, when the average cell pitch Pd of the first cells 22A is 100 μm, the average cell pitch Ps of the second cells 22B is set to one of 200 μm, 300 μm, 400 μm, 500 μm, 600 μm, 700 μm, and 800 μm. When the average cell pitch Pd of the first cells 22A is 250 μm, the average cell pitch Ps of the second cells 22B is set to one of 500 μm, 750 μm, 1,000 μm, 1,250 μm, 1,500 μm, 1,750 μm, and 2,000 μm.

In this way, the average cell pitch Ps is set to an integer multiple of the average cell pitch Pd, whereby interference between the first cells 22A and the second cells 22B is reduced. For this reason, moire is greatly reduced compared to when Ps/Pd has a value (for example, 1.5, 2.3, or the like) other than an integer.

In addition, when Ps/Pd is in a range of 2 to 8, the amount of change in capacitance between before and after the press (touch) of the finger is increased compared to a case where Ps/Pd is 1, in other words, a case where the average cell pitch Pd of the first cells 22A and the average cell pitch Ps of the second cells 22B are equal to each other. This will be described below.

The second cells 22B are not limited to the shape illustrated in FIG. 6, and may of course have a horizontally long diamond shape or a vertically long diamond shape.

As shown in FIG. 2, one end portion of each second electrode 18B is electrically connected to a second terminal wiring pattern 42b of the thin wire 20B through a second connection portion 40b.

When the width direction dimension (electrode width) of the first electrodes 18A in the y direction is Wd and the width direction dimension (electrode width) of the second electrodes 18B in the x direction is Ws, Ws/Wd can be set to be equal to or greater than 0.5 and equal to or less than 1.5. That is, in this embodiment, the average cell pitch Ps of the second electrodes 18B (upper electrode) is set to be greater than the average cell pitch Pd of the first electrodes 18A (lower electrode), and for this reason, touch detection accuracy is improved; thus, the electrode width Ws of the overlying second electrode 18B is not necessarily made smaller than the electrode width Wd of the underlying first electrodes 18A, and in some cases, the electrode width Ws may be made equal to the electrode width Wd, or the electrode width Ws may be made greater than the electrode width Wd. Of course, the electrode width Ws may be made smaller than the electrode width Wd. It is preferable that Ws/Wd is equal to or greater than 0.8 and equal to or less than 1.2. It is more preferable that the first electrodes 18A and the second electrodes 18B nearly have the same width since sensitivity in a vertical direction and sensitivity in a horizontal direction for a touch area are equal to each other.

It is preferable that the effective electrode area of the second electrodes 18B is equal to or greater than 70% of an effective touch area. With this, it is possible to reduce resistance of the electrodes. The effective electrode area indicates the ratio of an area covered by the second electrodes 18B in a display region. Specifically, in FIG. 2, the effective electrode area is a value calculated by dividing the product of the electrode width Ws of each of the upper electrodes (second electrodes 18B), the length of the sensor portion 112 in the y direction, and the number of upper electrodes (second electrodes 18B) by the area of the sensor portion 112.

Figure 12:
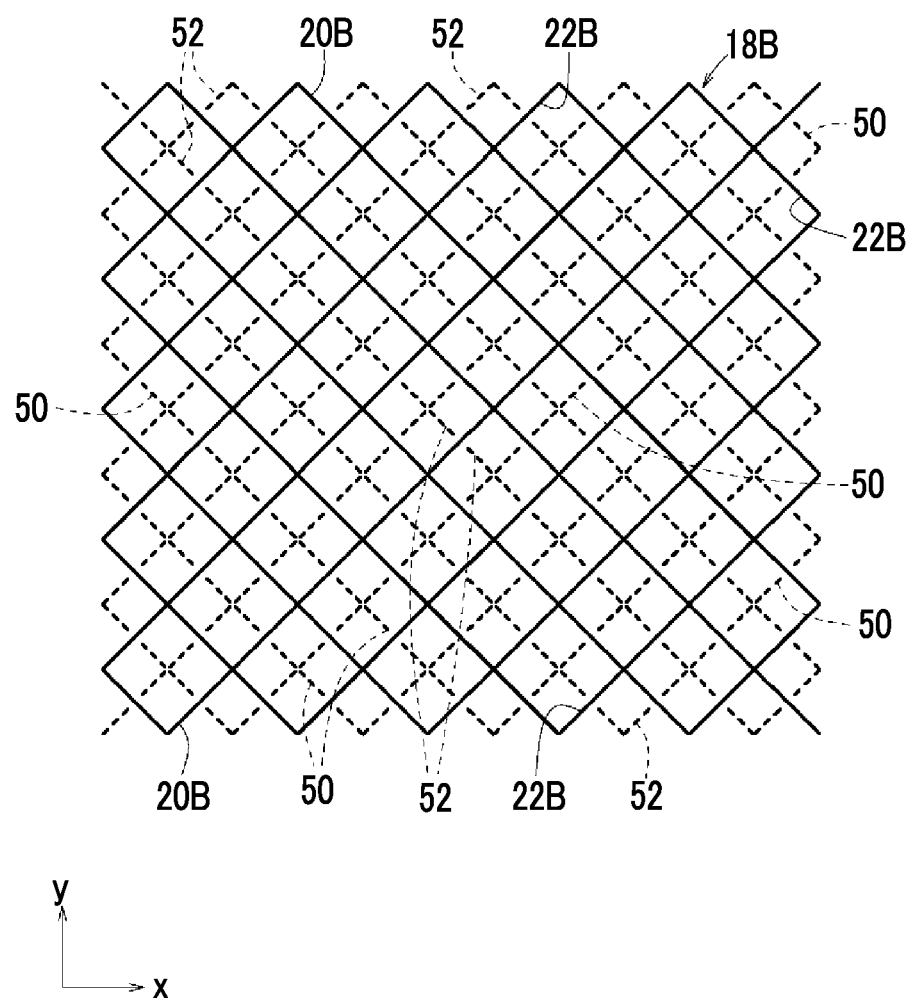
FIG. 12 is an example of an enlarged plan view of a main part of a second electrode and dummy thin wires formed in the conductive sheet.

As shown in FIG. 12 (described below), when there are dummy thin wires 50 in the second electrodes 18B, it is assumed that the dummy thin wires 50 are included in an effective electrode area as a region substantially covered by the second electrode 18B. In a case where there are dummy electrodes between a plurality of second electrodes 18B arranged in parallel, it is assumed that portions covered by the dummy electrodes are not covered by the second electrodes 18B, and thus, are not included in an effective electrode area.

As shown in FIG. 2, in the first sheet body 10A applied to the touch panel 100, multiple first electrodes 18A described above are arranged in a portion corresponding to the sensor portion 112, and a plurality of first terminal wiring patterns 42a of the thin wires 20A extending from the respective first connection portions 40a are arranged in the terminal wiring portion 114.

In the example of FIG. 1, in a lengthwise central portion of a peripheral portion of the terminal wiring portions 114 on one long side (x direction) of the first sheet body 10A, a plurality of first terminals 116a are arranged in a length direction of the one long side. A plurality of first connection portions 40a (for example, odd-numbered) are arranged linearly along one short side (y direction) of the sensor portion 112, and a plurality of first connection portions 40a (for example, even-numbered) are arranged linearly along the other short side (y direction) of the sensor portion 112.

The appearance of the second sheet body 10B has a rectangular shape when viewed from the top surface, and the appearance of the sensor portion 112 also has a rectangular shape. In a lengthwise central portion of a peripheral portion of the terminal wiring portion 114 on one ling side of the second sheet body 10B, a plurality of second terminals 116b are arranged in a length direction of the one long side. A plurality of second connection portions 40b are arranged linearly along one long side (x direction) of the sensor portion 112. The second terminal wiring patterns 42b extending from the respective second connection portions 40b extend toward the substantially central portion on one long side of the second sheet body 10B, and are respectively electrically connected to the corresponding second terminals 116b.

The manner in which the first terminal wiring patterns 42a extend may be the same as the second terminal wiring patterns 42b described above, and conversely, the manner in which the second terminal wiring patterns 42b extend may be the same as the first terminal wiring patterns 42a described above.

Figure 3:
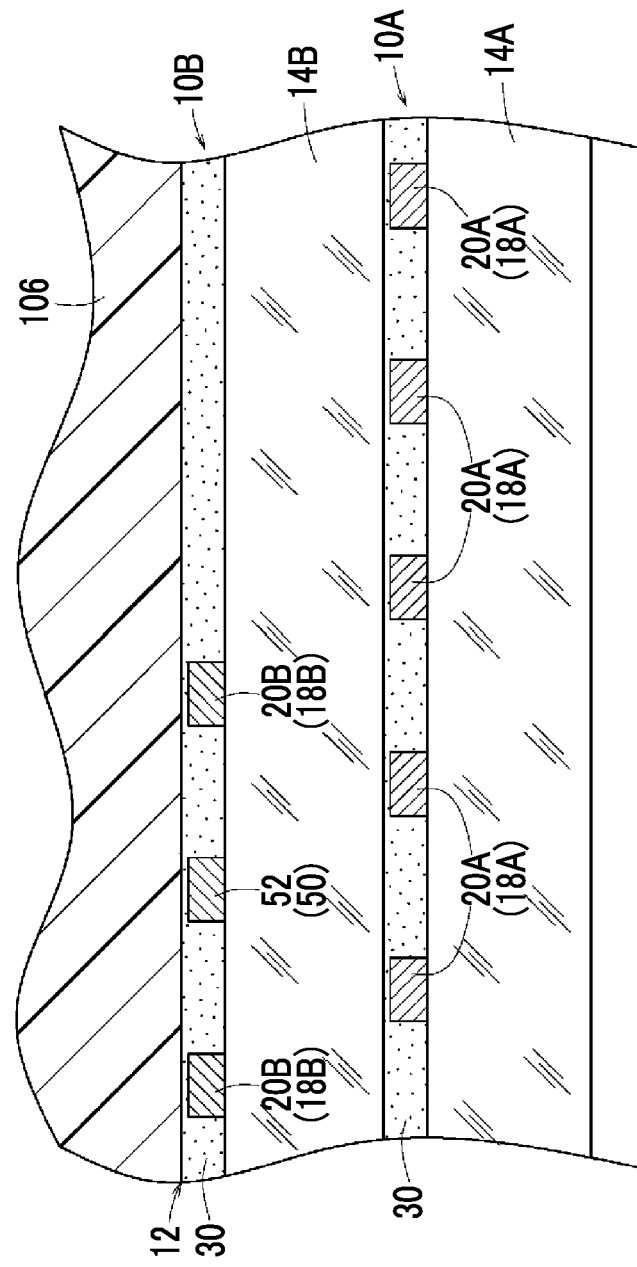
FIG. 3 is a schematic longitudinal sectional view of the conductive sheet.

As shown in FIG. 3, the laminated conductive sheet 12 has a configuration in which the second sheet body 10B is laminated on the first sheet body 10A. At this time, an adhesive (also referred to as OCA) 30 which is bonded as an adhesive sheet may be disposed between an upper end surface (that is, on the first electrodes 18A and the first transparent base 14A) of the first sheet body 10A and a lower end surface of the second sheet body 10B.

In the laminated conductive sheet 12 formed in this way, when Ps/Pd is 2, that is, an example of a place (overlapping portion) where the first electrode 18A shown in FIG. 4 overlaps the second electrode 18B shown in FIG. 6 is shown in FIG. 7 as a plan view. As above, thin solid lines and thick solid lines in FIG. 7 respectively correspond to the thin wires 20A and the thin wires 20B. That is, the reason that the thin solid lines and the thick solid lines are used is to easily distinguish between the thin wires 20A and 20B, and the thin solid lines and the thick solid lines are not intended to represent the actual line widths of the thin wires 20A and 20B.

Figure 8:
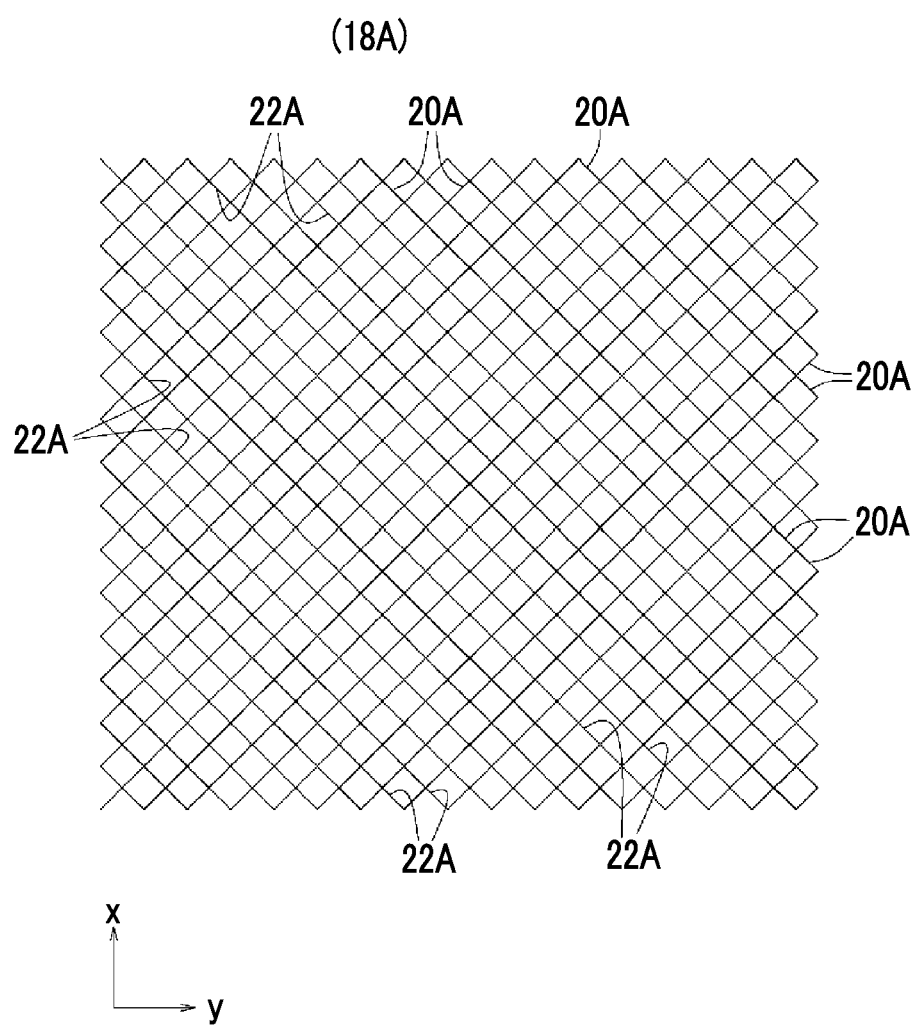
FIG. 8 is another example of an enlarged plan view of a main part of a first electrode formed in the conductive sheet.
Figure 9:
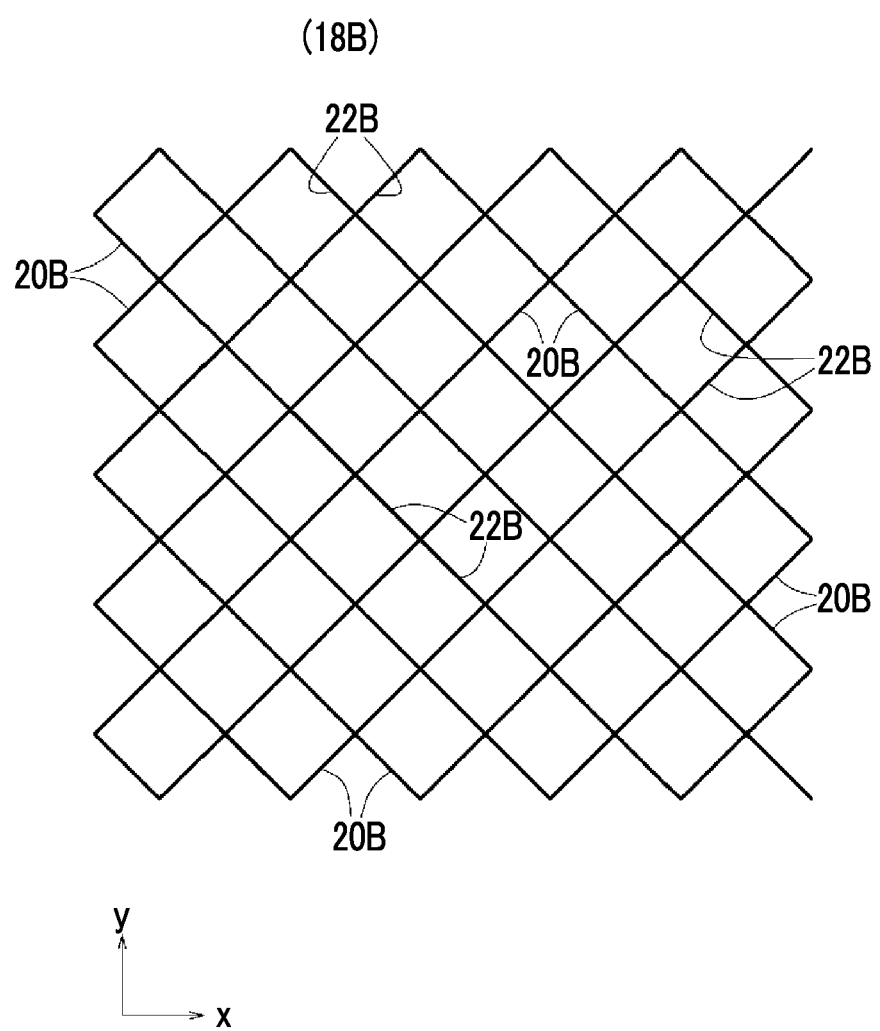
FIG. 9 is an example of an enlarged plan view of a main part of a second electrode formed in the conductive sheet.
Figure 10:
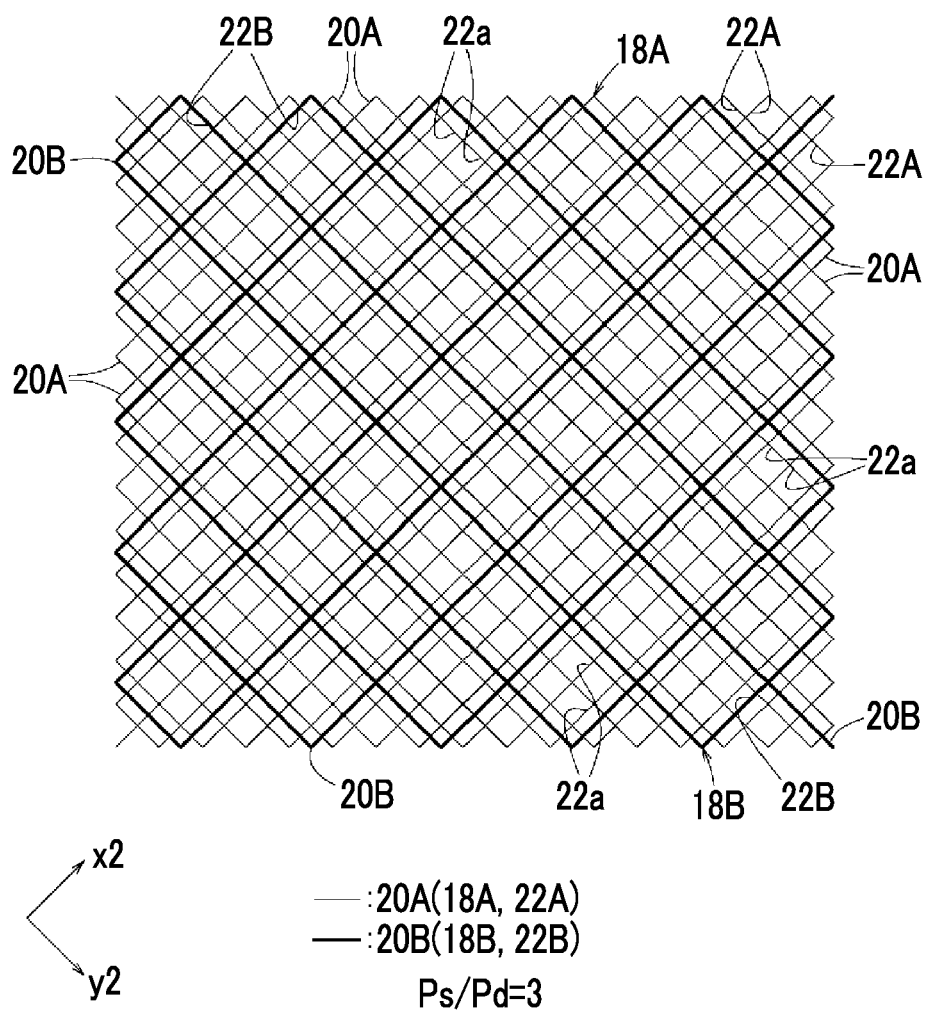
FIG. 10 is a schematic plan view showing an overlapping portion of the first electrode of FIG. 8 and the second electrode of FIG. 9.

FIGS. 8 and 9 show when the average cell pitch Ps of the second cells 22B is three times (Ps/Pd=3) the average cell pitch Pd of the first cells 22A. If the first electrode 18A shown in FIG. 8 overlaps the second electrode 18B shown in FIG. 9, the overlapping portion is as shown in FIG. 10 in plan view. As above, thin solid lines and thick solid lines in FIG. 10 respectively correspond to the thin wires 20A and the thin wires 20B.

In both of the examples of FIGS. 7 and 10, the first cells 22A are positioned in the openings of the second cells 22B. Hereinafter, if the first cells 22A are referred to as "in-opening cells 22a", frame lines (thin wires 20B) which form the second cells 22B do not cross the in-opening cells 22a.

For example, in a case of the overlapping portion of FIG. 7, either frame lines which form the second cells 22B and extend in an x2 direction or frame lines which extend in a y2 direction cross the eight first cells 22A surrounding the respective in-opening cells 22a. That is, while metal wires become coarse in the in-opening cells 22a, metal wires become dense in the first cells 22A around the respective in-opening cells 22a.

Figure 11:
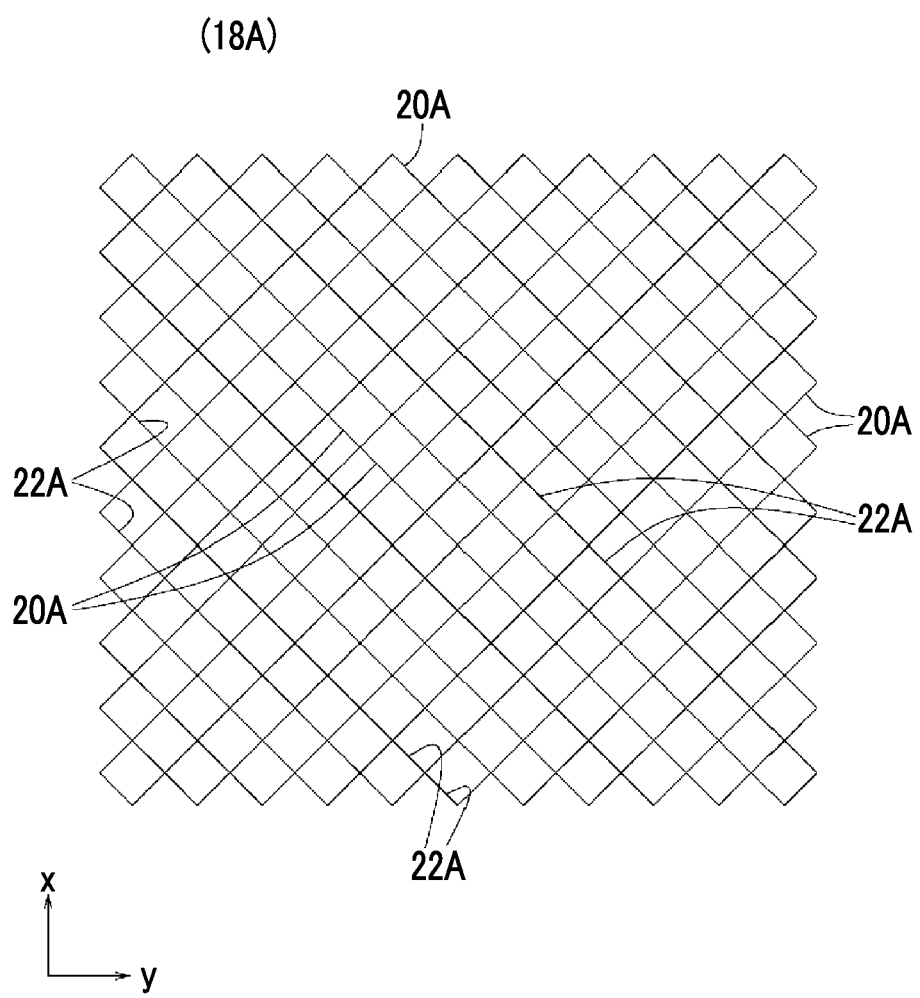
FIG. 11 is still another example of an enlarged plan view of a main part of a first electrode formed in the conductive sheet.

Although there is no problem even in a state where coarse and dense patterns occur, as shown in FIG. 12, a configuration in which the dummy thin wires 50 are added to the second cells 22B overlaps the first electrodes 18A shown in FIG. 11. In this case, it is assumed that the average cell pitch Ps of the second cells 22B is determined without consideration of the dummy thin wires 50. In FIG. 12, in order to easily distinguish between the dummy thin wires 50 and the second cells 22B, the thin wires 52 forming the dummy thin wires 50 are indicated by broken lines, and the thin wires 20B forming the second cells 22B are indicated by thick solid lines.

Similarly to the thin wires 20A and 20B forming the cells 22A and 22B, the dummy thin wires 50 are formed with thin wires 52 (metal wires) made of silver, copper, molybdenum, or an alloy containing one of them, for example, in a cross shape by making the metal thin wires intersect each other. However, the end portions of the dummy thin wires 50 are separated from the thin wires 20B forming the second cells 22B, and for this reason, electric conduction is not provided between the second electrodes 18B and the dummy thin wires 50.

The dummy thin wires 50 may have a broken line shape in which a plurality of short lines are arranged in parallel. In this case, it is possible to reduce the effect of the dummy thin wires 50 shielding electric field from the first electrodes 18A (lower electrodes).

Figure 13:
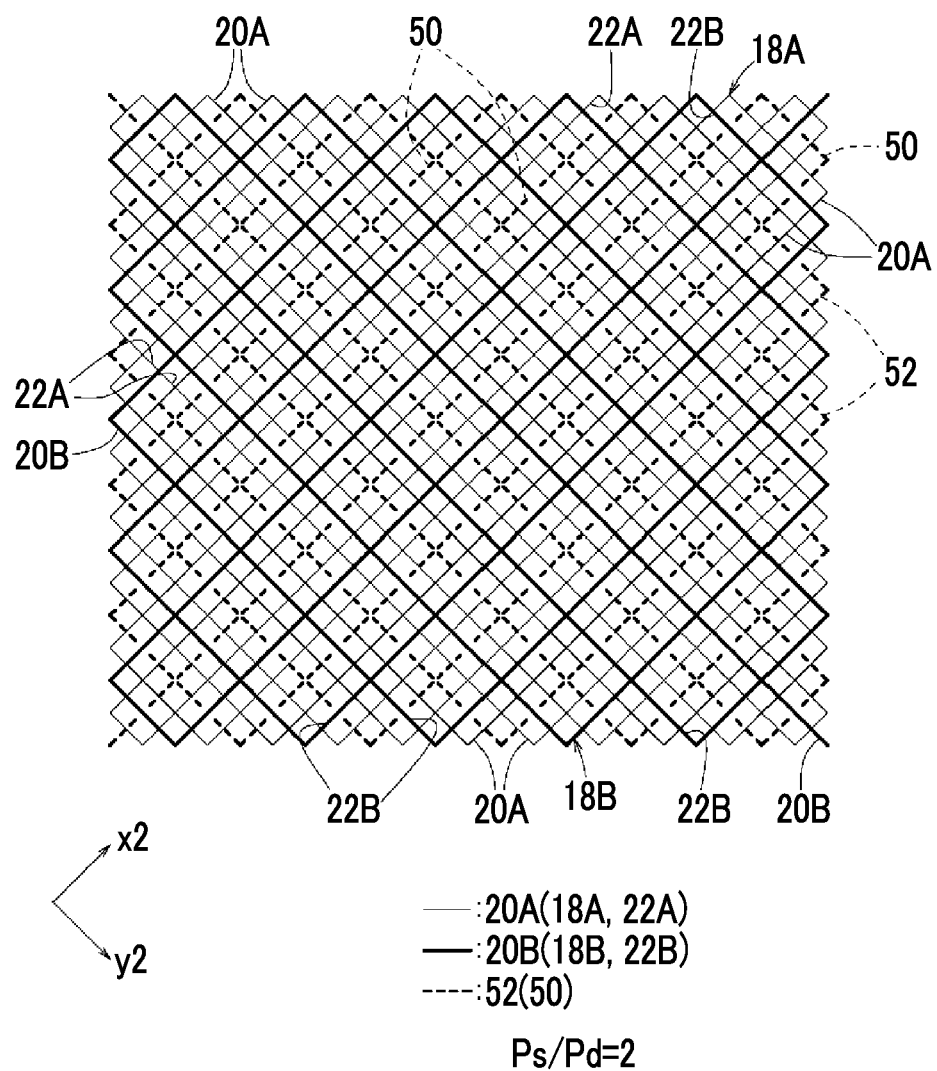
FIG. 13 is a schematic plan view showing an overlapping portion of the first electrode of FIG. 11 and the second electrode and the dummy thin wires of FIG. 12.

An example of an overlapping portion of the first electrode 18A shown in FIG. 11 and the second electrode 18B and the dummy thin wires 50 shown in FIG. 12 is shown in FIG. 13 as a plan view. Thin solid lines in FIG. 13 indicate the thin wires 20A forming the first cells 22A of the first electrode 18A, thick solid lines indicate the thin wires 20B of the second cells 22B of the second electrode 18B, and broken lines indicate the dummy thin wires 50 provided in the openings of the second cells 22B. The reason that the thin solid lines, the thick solid lines, and the broken lines are used is to easily distinguish between the thin wires 20A, 20B, and 52 as described above, and the thin solid lines, the thick solid lines, and the broken lines are not intended to represent actual line widths. FIGS. 11, 12, and 13 illustrate when Ps/Pd=2.

Even in the overlapping portion, similarly to FIG. 10, either frame lines which form the second cell 22B and extend in the x2 direction or frame lines which extend in the y2 direction cross the eight first cells 22A surrounding the respective in-opening cells 22a. In the cases shown in FIGS. 12 and 13, the dummy thin wires 50 are disposed in the openings of the second cells 22B. For this reason, the dummy thin wires 50 are positioned above the in-opening cells 22a through the second sheet body 10B as an insulating layer. That is, the dummy thin wires 50 are provided in the openings at positions where the first cells 22A (in-opening cells 22a) are included in the openings of the second cells 22B in plan view.

Accordingly, the thin wires 52 which form the dummy thin wires 50 cross the in-opening cells 22a. As a result, the coarse and dense patterns of the frame lines (thin wires 20A, 20B, 52) are the same in the in-opening cells 22a and the surrounding first cells 22A. With this, the in-opening cells 22a are made hard to be visually recognized.

That is, the dummy thin wires 50 are provided in the second cells 22B constituting the second electrode 18B, whereby thin wire appearance is improved (the second mesh is made hard to be visually recognized).

It is preferable that a part of the thin wires of the first cells 22A (first mesh) at the places which will be originally opposed to the second cells 22B (second mesh) are reduced in line width or become a disconnection portion. In other words, a narrow width portion or a disconnection portion may be provided at the places of the thin wires 20A forming the first mesh opposed to the second mesh. Of course, in contrast, a part of the places of the thin wires 20B forming the second mesh opposed to the first mesh may be reduced in line width or may become a disconnection portion.

In this case, capacitance becomes small in the disconnection portion. That is, the initial value of capacitance becomes small. In a case where the initial value of capacitance is large, when capacitance changes with the press of the finger by the operator, it is not easy to improve a signal to noise ratio (S/N ratio); however, it is designed to decrease the opposing area at the places where the first mesh and the second mesh are opposed to each other, whereby it is possible to achieve improvement of the S/N ratio.

In a case where the laminated conductive sheet 12 including the first electrodes 18A and the second electrodes 18B configured as above is used as the touch panel 100, the protective layer 106 is formed on the second sheet body 10B. The adhesive (OCA) 30 as an adhesive sheet is disposed between an upper end surface of the second sheet body 10B and a lower end surface of the protective layer 106. The first terminal wiring patterns 42a extending from the multiple first electrodes 18A of the first sheet body 10A and the second terminal wiring patterns 42b extending from the multiple second electrodes 18B of the second sheet body 10B are connected to, for example, a control circuit which controls scanning.

In order to a pattern having a narrow line width, the first electrodes 18A and the second electrodes 18B can be preferably formed by an etching method using a photolithography process, a micro-contact printing patterning method, or a silver salt method. In order to repeatedly obtain a large number of random patterns, a silver salt method is more preferably used.

The micro-contact printing patterning method is a method which obtains a pattern having a narrow line width using a micro-contact printing method. The micro-contact printing method is a method which uses an elastic polydimethylsiloxane stamp and brings a thiol solution into contact with a gold substrate as ink to produce a monolayer pattern (see Whitesedes, Angew. Chem. Int. Ed., 1998, Vol. 37, pp. 550).

A representative process of the micro-contact printing patterning method is, for example, as follows. That is, first, a metal is coated on a substrate (for example, silver is sputter-coated on a PET substrate).

Next, monolayer masking is stamped on the metal-coated substrate using the micro-contact printing method. Thereafter, the metal coated on the substrate is removed by etching except for the pattern under the masking.

In regard to the above, a specific operation and the like are described in detail in the paragraph <0104> of JP2012-519329A.

The silver salt method exposes and develops a photosensitive material having a photosensitive silver salt containing layer to obtain the thin wires 20A or 20B forming the mesh. A specific operation and the like are described in detail in the paragraphs <0163> to <0241> of JP2009-004348A.

The invention is not particularly limited to the embodiment described above, and various changes may be made without departing from the spirit of the invention.

Figure 14:
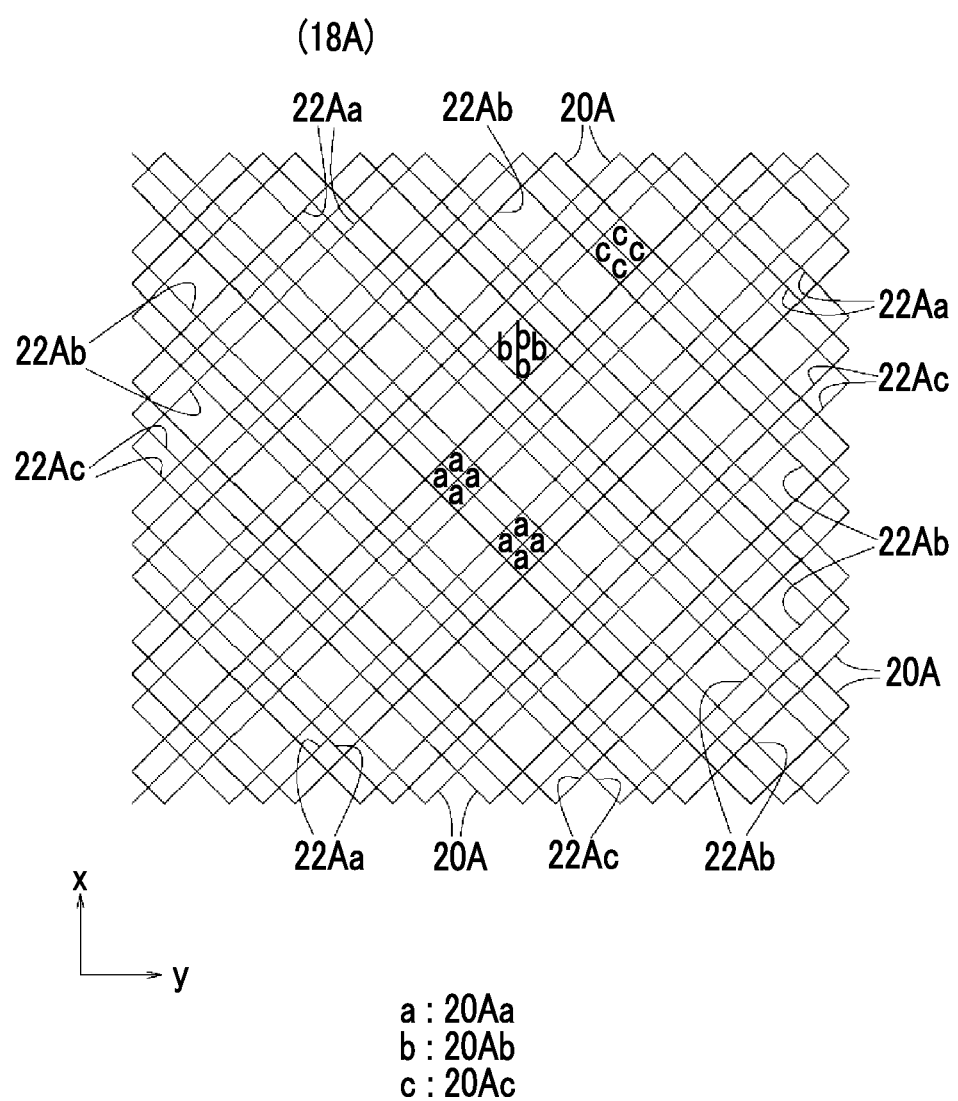
FIG. 14 is still another example of an enlarged plan view of a main part of a first electrode formed in the conductive sheet.
Figure 15:
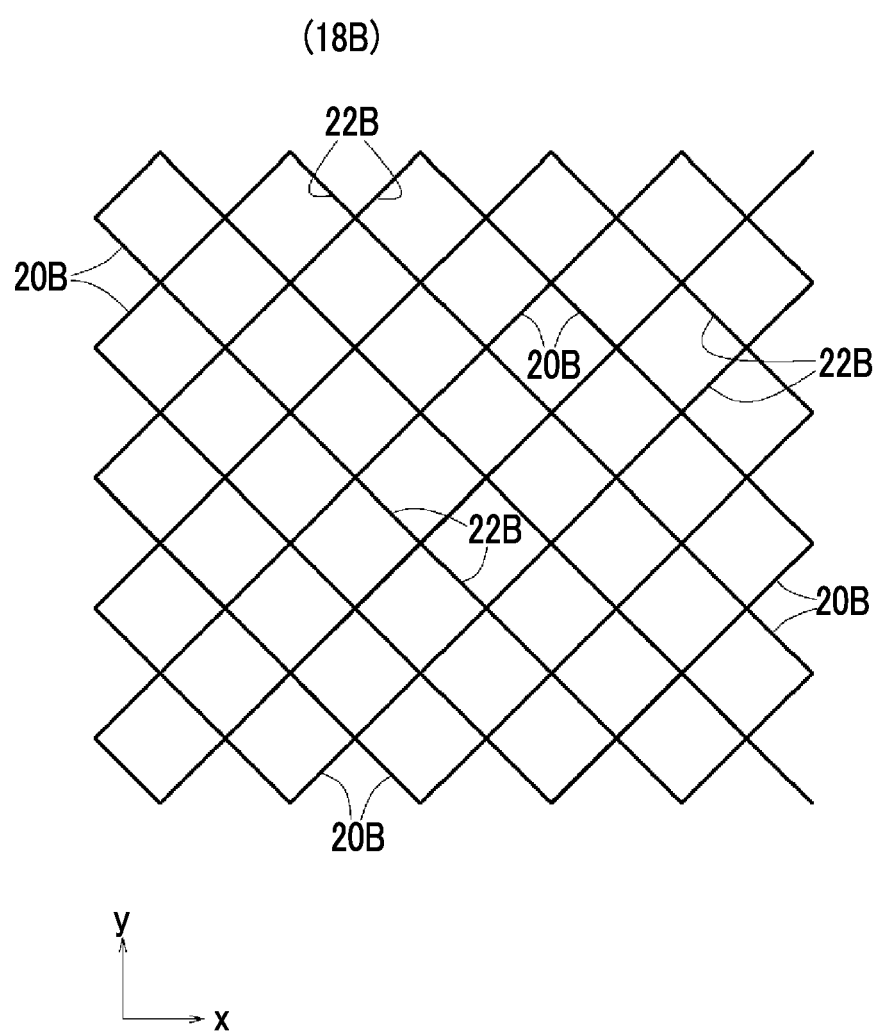
FIG. 15 is an example of an enlarged plan view of a main part of a second electrode formed in the conductive sheet.
Figure 16:
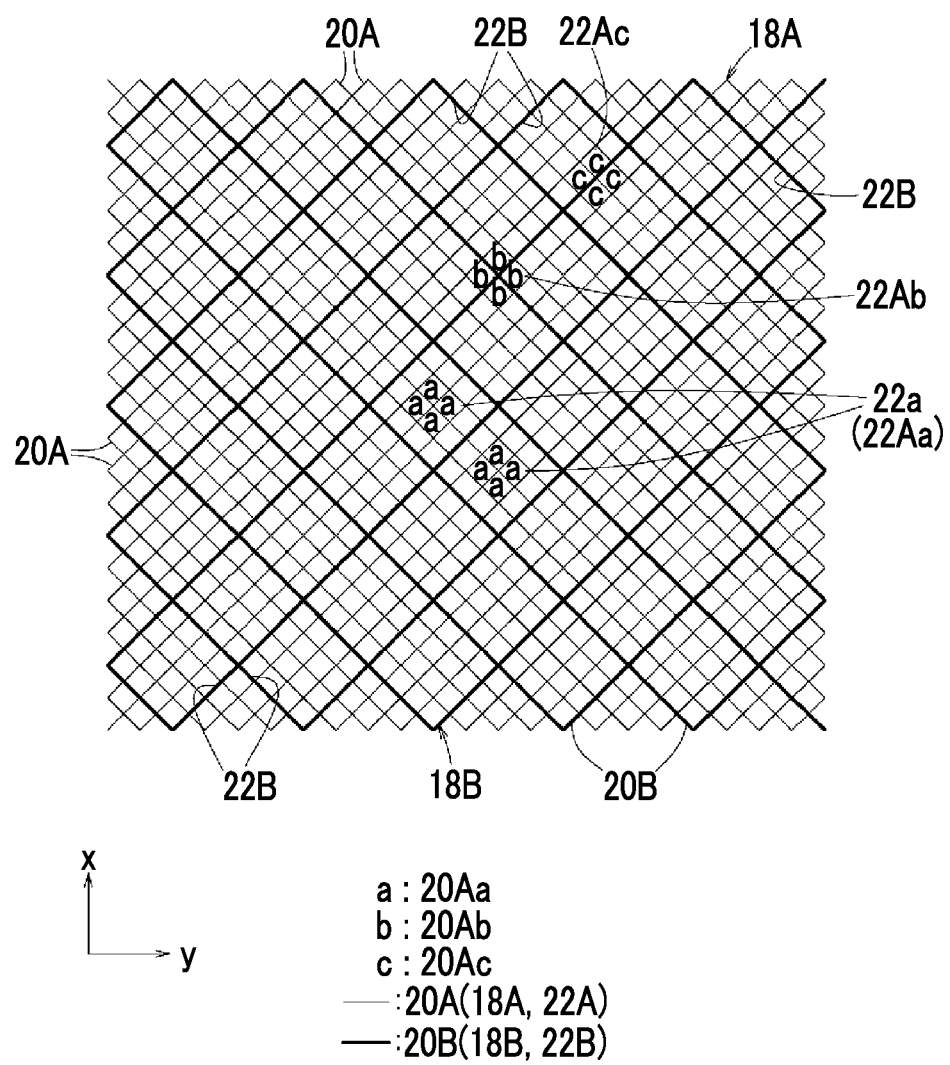
FIG. 16 is a schematic plan view showing an overlapping portion of the first electrode of FIG. 14 and the second electrode of FIG. 15.

For example, in FIG. 13, although a configuration in which the dummy thin wires 50 are provided in the openings of the second cells 22B has been described, as shown in FIG. 14, a first electrode 18A in which a part of the first cells 22Aa have a pitch smaller than cells 22Ab and 22Ac (first cells) around the first cells 22Aa may be provided, and for example, a second electrode 18B shown in FIG. 15 may overlap the first electrode 18A. In this case, as shown in FIG. 16, the first cells 22Aa having the minimum pitch are positioned so as to be included in the openings of the second cells 22B in plan view. That is, the first cells 22Aa become the in-opening cells 22a.

In FIGS. 14 and 16, thin solid lines represent the thin wires 20A which form the first electrode 18A, and thick solid lines represent the thin wires 20B which form the second electrode 18B. As above, the thin solid lines and the thick solid lines are to easily distinguish between the thin wires 20A and 20B, and do not reflect actual line widths. In FIG. 14, the indexes "a", "b", and "c" are assigned to the representative cells among the first cells 22Aa to 22Ac, and in FIG. 16, the same indexes are assigned at the positions corresponding to the positions assigned with the indexes in FIG. 14.

In a case where the first electrode 18A is configured as shown in FIG. 14, it is assumed that only 30 in-opening cells 22a (first cells 22Aa) positioned in the openings of the second electrode 18B are extracted to determine the average cell pitch Pd. That is, the pitches of the first cells 22Ab and 22Ac are not included in calculation when setting the average cell pitch Ps of the first electrode 18A.

In this case, similarly to FIG. 13, the coarse and dense patterns of the frame lines are the same the in-opening cells 22a (first cells 22Aa) and the surrounding first cells 22Ab and 22Ac. Therefore, the in-opening cells 22a can be made hard to be visually recognized.

In this case, the average cell pitch Ps in the second electrode 18B may be set to two times to eight times (however, an integer multiple) the average cell pitch Pd of the first cells 22Aa. FIG. 16 illustrates a case where Ps/Pd=4.

In the embodiment described above, although the electrode widths Ws and Wd are constant (see FIG. 2), a part of the electrode width may be decreased in the middle of extending in the longitudinal direction. In this case, parts having a small electrode width may be disposed in a laminated manner. An electrode which has a part having a different electrode width may be either the first electrode 18A or the second electrode 18B.

In this case, similarly to when a disconnection portion is provided at each intersection place of the first mesh and the second mesh, the initial value of capacitance at the intersection place becomes small. Therefore, it is possible to achieve improvement of the S/N ratio. In this form, a disconnection portion may be of course provided at each intersection place of the first mesh and the second mesh.

Figure 17:
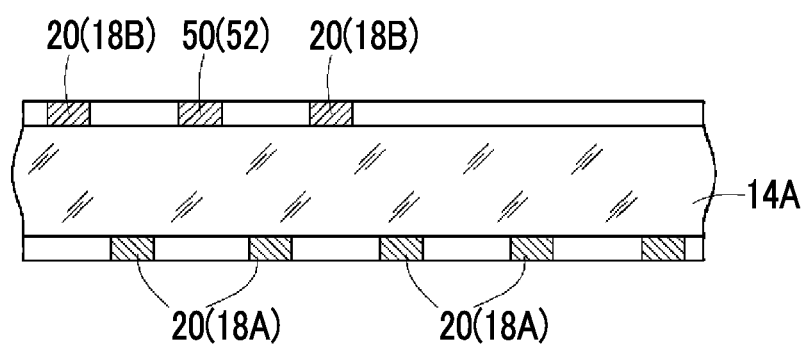
FIG. 17 is a schematic longitudinal sectional view of a conductive sheet according to an embodiment different from FIG. 3.

The laminated conductive sheet 12 is not limited to a laminated conductive sheet in which the first electrodes 18A are formed on one principal surface of the first transparent base 14A, the second electrodes 18B are formed on one principal surface of the second transparent base 14B, and the first transparent base 14A and the second transparent base 14B are laminated (see FIGS. 2 and 3). That is, as shown in FIG. 17, the first electrodes 18A may be formed on one principal surface of the first transparent base 14A, and the second electrodes 18B may be formed on the other principal surface of the first transparent base 14A. In this case, a form is made in which the second transparent base 14B is not provided, the first transparent base 14A is laminated on the second electrodes 18B, and the first electrodes 18A are laminated on the first transparent base 14A.

In all cases, the use of the laminated conductive sheet 12 is not particularly limited to the sensor body 102 of the touch panel 100, and can be used for various electrodes of an inorganic EL element, an organic EL element, or a solar cell. The laminated conductive sheet 12 can also be applied to a transparent heating element (for example, a defroster of a vehicle) which generates heat when a current flows, and an electromagnetic shielding material which shields electromagnetic waves, in addition to the electrodes.

EXAMPLE 1

A conductive sheet in which one lower electrode (first electrode 18A) having an electrode width Wd of 5 mm and an average cell pitch Pd of 300 µm is formed on a transparent base and a conductive sheet in which one upper electrode (second electrode 18B) having an electrode width Ws of 5 mm is formed on a transparent base are bonded to each other through an OCA to obtain electrode laminate. Of course, the lower electrode and the upper electrode are partially opposed to each other.

In this configuration, the average cell pitch Ps of the upper electrode is varied as shown in Table 1 described below, and electrode laminates of Examples 1 to 5 and Comparative Examples 1 to 3 are constituted. Thereafter, the amount (ΔCm value) of change in capacitance between before and after touch in each electrode laminate is determined. When the value of ΔCm is large, the possibility of detecting touch is increased, and detection accuracy is improved.

TABLE 1

| | Electrode Average Cell Pitch (µm) | | | | |
| | Lower Electrode (Pd) | Upper Electrode (Ps) | Ps/Pd | ΔCm Value | Moire Evaluation |
|---|---|---|---|---|---|
| Comparative Example 1 | 300 | 300 | 1 | 0.7 | A |
| Comparative Example 2 | 300 | 450 | 1.5 | 0.82 | C |
| Example 1 | 300 | 600 | 2 | 0.92 | A |
| Example 2 | 300 | 900 | 3 | 1 | A |
| Example 3 | 300 | 1200 | 4 | 0.97 | A |
| Example 4 | 300 | 1800 | 6 | 0.88 | A |
| Example 5 | 300 | 2400 | 8 | 0.73 | A |
| Comparative Example 3 | 300 | 3000 | 10 | 0.6 | A |

Figure 18:
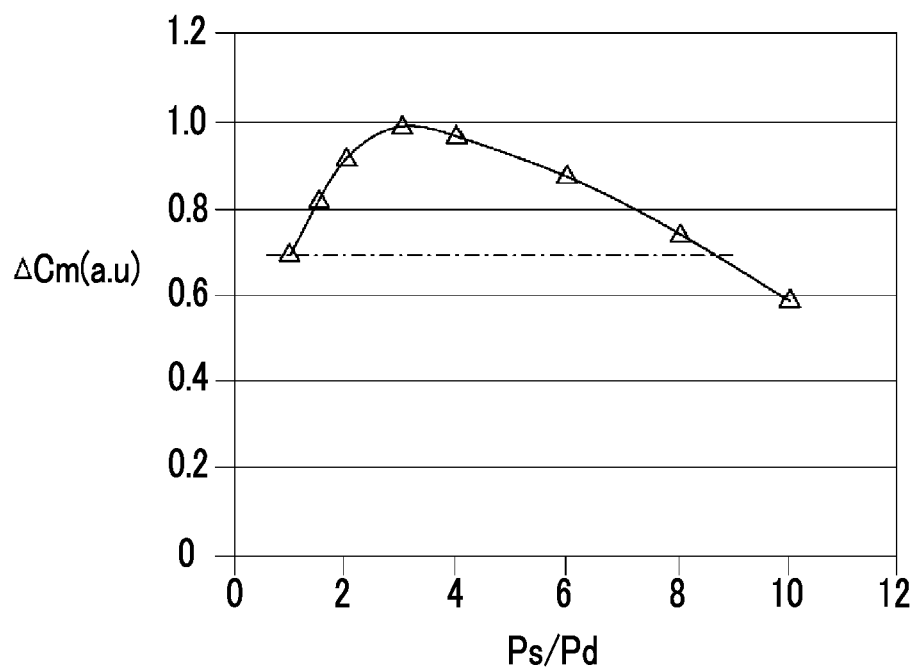
FIG. 18 is a graph showing the relationship between Ps/Pd which is the ratio between an average cell pitch Pd of first cells and an average cell pitch Ps of second cells and the amount of change in capacitance between before and after the press of a finger.

A result is shown in FIG. 18 as a graph in which the horizontal axis is Ps/Pd and the vertical axis is ΔCm. From FIG. 18, it is understood that, if Ps/Pd is in a range greater than 1 and equal to or less than 8, ΔCm is improved compared to when Ps/Pd=1 (Comparative Example 1). In particular, in a case where Ps/Pd is 2 to 6, in other words, when the average cell pitch Ps of the second cells 22B (second mesh) is two times to six times the average cell pitch Pd of the first cells 22A (first mesh), the effect is remarkable. This means that the S/N ratio, and consequently, touch detection accuracy can be improved.

The reason is because, when the average cell pitch Ps is made greater than the average cell pitch Pd, an electric field from the first cells toward the second cells easily passes through the openings of the second cells, and for this reason, the amount of change in capacitance between before and after the press of the finger is increased. Therefore, it is possible to improve touch detection accuracy without decreasing the electrode width Ws of the upper electrode.

As a reason that Ps/Pd is decreasing after peaking in the vicinity of 3, it is considered that, when the average cell pitch Ps of the upper electrode becomes large, since the lower electrode positioned near the center of the opening of the upper electrode is distant from the upper electrode, the effect of an electric field from the lower electrode on the upper electrode is reduced, and thus, the contribution to the ΔCm value is small. Accordingly, the average cell pitch Ps of the upper electrode is not necessarily so large, and has a preferable range.

In regards to the respective electrode laminates of Examples 1 to 5 and Comparative Examples 1 to 3, the opposing portions (5 mm×5 mm) of the electrodes are visually observed, a case where moire is not observed in the opposing portion at all is evaluated as "A", a case where moire is visually recognized slightly in the opposing portions but has an allowable level is evaluated as "B", and a case where moire can be confirmed in the opposing portions and has a level causing no problem is evaluated as "C". A result is shown in Table 1 together.

As shown in Table 1, in Comparative Example 2 in which Ps/Pd=1.5, ΔCm is large compared to Comparative Example 1 in which Ps/Pd=1, while an unallowable degree of moire is recognized. In contrast, when Ps/Pd=2, 3, 4, 6, 8, the occurrence of moire is not recognized.

From the above, Ps/Pd is set to an integer in a range of 2 to 8, and more preferably, an integer in a range of 2 to 6, whereby moire is reduced and yield of touch detection is sufficient in the touch panel 100 (display device 108).

In addition, since it is not necessary to make the electrode width Ws of the second electrode 18B extremely small, it is not necessary to make the opening area of the second cell 22B small. In other words, the second electrode 18B can be formed as a mesh having a large average cell pitch Ps. For this reason, the transmittance of the second electrode 18B is improved.

The ratio between the average cell pitches of both of the first electrode 18A and the second electrode 18B is set to a specific value, whereby it is possible to suppress the occurrence of moire due to the pitch difference.

EXPLANATION OF REFERENCES

10A: first sheet body
10B: second sheet body
12: laminated conductive sheet (conductive sheet)
14A: first transparent base
14B: second transparent base
18A: first electrode
18B: second electrode
20A, 20B, 52: thin wire
22A, 22Aa to 22Ac: first cell
22a: in-opening cell (first cell)
22B: second cell
30: adhesive (OCA)
50: dummy thin wire
100: touch panel
102: sensor body
106: protective layer
108: display device
110: display panel
112: sensor portion
114: terminal wiring portion

What is claimed is:

1. A conductive sheet comprising:
a first electrode disposed under an insulating layer; and
a second electrode disposed above the insulating layer, the first electrode and the second electrode being opposed to each other through the insulating layer,
wherein the first electrode has a first mesh with a plurality of linked first cells in a diamond shape formed by making metal wires intersecting each other, a plurality of first electrodes extending in a first direction and being arranged in parallel to a second direction orthogonal to the first direction,
the second electrode has a second mesh with a plurality of linked second cells in a diamond shape formed by making metal wires intersecting each other, a plurality of second electrodes extending in the second direction and being arranged in parallel to the first direction,
when the average cell pitch of the first cells is Pd and the average cell pitch of the second cells is Ps, Ps/Pd is an integer equal to or greater than 2 and equal to or less than 8,
the first electrode has in-opening cells that the first cells are provided in the openings of the second cells in plan view,
density of the metal wires is the same in plan view in an overlapping portion where the first electrode overlaps the second electrode, and
the first cells have two obtuse angles and two acute angles, intersection angles of the obtuse angles in a diagonal relationship being the same angle greater than 90°, and intersection angles of the acute angles being the same angle less than 90°.

2. The conductive sheet according to claim 1,
wherein Ps/Pd is an integer equal to or greater than 2 and equal to or less than 6.

3. The conductive sheet according to claim 1,
wherein an effective electrode area of the second electrode is equal to or greater than 70% of an effective touch area.

4. The conductive sheet according to claim 2,
wherein an effective electrode area of the second electrode is equal to or greater than 70% of an effective touch area.

5. The conductive sheet according to claim 1,
wherein dummy thin wires are provided in the openings of the second cells at positions where the first cells are included in the openings of the second cells in plan view.

6. The conductive sheet according to claim 2,
wherein dummy thin wires are provided in the openings of the second cells at positions where the first cells are included in the openings of the second cells in plan view.

7. The conductive sheet according to claim 3,
wherein dummy thin wires are provided in the openings of the second cells at positions where the first cells are included in the openings of the second cells in plan view.

8. The conductive sheet according to claim 1,
wherein the average cell pitch of the first cells in the openings is set to be smaller than the average cell pitch of the cells surrounding the first cells in the openings at positions where the first cells are included in the openings of the second cells in plan view.

9. The conductive sheet according to claim 2,
wherein the average cell pitch of the first cells in the openings is set to be smaller than the average cell pitch of the cells surrounding the first cells in the openings at positions where the first cells are included in the openings of the second cells in plan view.

10. The conductive sheet according to claim 1,
wherein, when the electrode width of the first electrode is Wd and the electrode width of the second electrode is Ws, Ws/Wd is equal to or greater than 0.5 and equal to or less than 1.5.

11. The conductive sheet according to claim 2,
wherein, when the electrode width of the first electrode is Wd and the electrode width of the second electrode is Ws, Ws/Wd is equal to or greater than 0.5 and equal to or less than 1.5.

12. The conductive sheet according claim 1,
wherein the average cell pitch of the first cells positioned in the openings of the second cells is equal to or greater than 50 μm and equal to or less than 400 μm, and the average cell pitch of the second cells is equal to or greater than 100 μm and equal to or less than 3,200 μm.

13. The conductive sheet according claim 2,
wherein the average cell pitch of the first cells positioned in the openings of the second cells is equal to or greater than 50 μm and equal to or less than 400 μm, and the average cell pitch of the second cells is equal to or greater than 100 μm and equal to or less than 3,200 μm.

14. The conductive sheet according to claim 1,
wherein at least the metal wires forming the first cells or the metal wires forming the second cells are reduced in line width or become a disconnection portion at a part of places where the first mesh and the second mesh are opposed to each other.

15. The conductive sheet according to claim 2,
wherein at least the metal wires forming the first cells or the metal wires forming the second cells are reduced in line width or become a disconnection portion at a part of places where the first mesh and the second mesh are opposed to each other.

16. The conductive sheet according to claim 1,
wherein the electrode width of at least the first electrode or the second electrode is set to be smaller than other parts at places where the first mesh and the second mesh are opposed to each other.

17. The conductive sheet according to claim 2,
wherein the electrode width of at least the first electrode or the second electrode is set to be smaller than other parts at places where the first mesh and the second mesh are opposed to each other.

18. A capacitive touch panel comprising:
the conductive sheet according to claim 1.

19. A capacitive touch panel comprising:
the conductive sheet according to claim 2.

20. A display device comprising:
the capacitive touch panel according to claim 18.

21. The conductive sheet according to claim 1,
wherein the metal wires are provided in the in-opening cells and eight first cells surrounding the respective in-opening cells in plan view, and density of the metal wires is the same in plan view in the in-opening cells and the eight first cells surrounding the respective in-opening cells in plan view.

22. The conductive sheet according to claim 1,
wherein the intersection angles of the acute angles are the same angle less than 70°.

* * * * *